United States Patent
Su et al.

(10) Patent No.: US 9,145,516 B2
(45) Date of Patent: Sep. 29, 2015

(54) ILLUMINATING DEVICE AND METHOD FOR PREPARING INORGANIC NANO-MATERIAL

(75) Inventors: Yen Hsun Su, Kaohsiung (TW); Shen-Lung Tu, Tainan (TW); Shih-Hui Chang, Tainan (TW); Wei-Min Zhang, Tainan (TW); Shih-Wen Tseng, Tainan (TW); Yun-Chorng Chang, Tainan (TW)

(73) Assignee: NATIONAL CHENG KUNG UNIVERSITY (TW)

( * ) Notice: Subject to any disclaimer, the term of this patent is extended or adjusted under 35 U.S.C. 154(b) by 360 days.

(21) Appl. No.: 13/188,963

(22) Filed: Jul. 22, 2011

(65) Prior Publication Data

US 2012/0246761 A1  Sep. 27, 2012

(30) Foreign Application Priority Data

Mar. 23, 2011  (TW) .............................. 100109987 A

(51) Int. Cl.
  *C09K 11/58* (2006.01)
  *C09K 11/87* (2006.01)
  *A41G 1/00* (2006.01)

(52) U.S. Cl.
  CPC ................. *C09K 11/58* (2013.01); *C09K 11/87* (2013.01); *A41G 1/005* (2013.01)

(58) Field of Classification Search
  None
  See application file for complete search history.

(56) References Cited

FOREIGN PATENT DOCUMENTS

TW       200521084       7/2005

OTHER PUBLICATIONS

Su, H.Y. et al. Nanoscale (2010) vol. 2, pp. 2639-2646.*
Su, H.Y. et al. (2007) Journal of Nanoscience and Nanotechnology; vol. 7, pp. 3146-3151.*
Iida, H. et al., Electrochimica Acta (2006) vol. 52, pp. 292-296.*
Wang, C.Y. et al. Materials Science and Engineering B60 (1999) pp. 223-226.*
Yang, C. et al., Journal of Alloys and Compounds (2004) pp. 283-287.*
Faraji, M et al. Talanta, (2010) vol. 81, pp. 831-836.*
Fredy Kurniawan, "New Analytical Applications of Gold Nanoparticles," Faculty of Chemistry and Pharmacy, University of Regensburg, Germany, Mar. 2008.
Lo et al., "Greener Approaches Toward the Synthesis of Micro- and Nano-structure Materials," Chemistry (The Chinese Chemical Society, Taipei), Dec. 2007, vol. 65, No. 4, pp. 409-418.
Taiwanese Office Action in Application 100109987, issued Jul. 25, 2013.

* cited by examiner

*Primary Examiner* — Russell Kallis
(74) *Attorney, Agent, or Firm* — Volpe and Koenig, P.C.

(57) ABSTRACT

A method for preparing an inorganic nano-material is provided. The method includes steps of providing a first solution including plural metal ions; mixing the first solution with a surfactant and adding a reduction agent to generate a second solution, wherein the second solution generates plural metal atoms reduced from the plural metal ions; and adding an oxidation agent into the second solution for oxidizing the plural metal atoms so as to generate plural metal oxides and form the inorganic nano-material.

13 Claims, 5 Drawing Sheets

ILLUMINATING DEVICE AND METHOD FOR PREPARING INORGANIC NANO-MATERIAL

CROSS REFERENCE TO RELATED APPLICATIONS

The application claims the benefit of Taiwan Patent Application No. 100109987, filed on Mar. 24, 2011, at the Taiwan Intellectual Property Office, the disclosures of which are incorporated herein in their entirety by reference.

FIELD OF THE INVENTION

The present invention relates to an illuminating device, especially to an illuminating device with an organic object and a manufacturing method for preparing an illuminating material disposed in the illuminating device.

BACKGROUND OF THE INVENTION

Photoluminescence can be divided into fluorescence and phosphorescence. When a material absorbs the energy of the external light, the electrons in the ground state in the material are excited to a excited state, at this moment if the energy is quickly released to a state of a minimum vibration, i.e. one of the excited states, and then is released back to the ground state in a form of light emission, and this phenomenon is called fluorescence; while if the energy is transferred by an inter-system crossing to an excited state with different self-spinning multiples, and released to a state of a minimum vibration, and then is released back to the ground state in a form of light emission, and this phenomenon is called phosphorescence. Currently the material able to generate fluorescence or phosphorescence can be divided into inorganic and organic materials. The organic fluorescence materials are usually transferred to a biological body by adopting the transgenic method. For instance, the natural fluorescence protein can be extracted from the bodies of thousands of *Aequorea Victoria*. This protein can emit green fluorescence, and is called green fluorescent protein (GFP). The research shows that the GFP has a special chromophore, which is a chemical functional group able to absorb and emit light. When radiated by the violet or blue light, the chromophore of the GFP absorbs the energy of the light and is excited, and then emits the light to release the energy, where the emitted light has a wavelength located within the wavelength range of the green light. Since some unanticipated risks of the gene transfer exist, the strict regulations for the gene transfer are setup specially for changing the gene composition of the biological body so as to avoid the damages on the other original biological bodies due to the gene escape.

Another type of inorganic fluorescence materials are fluorescence powders or various metal materials. Since the fluorescence powders have excellent illuminating efficiency, currently most of the illuminating devices adopt the fluorescence powders. The major raw materials of the fluorescence materials are rare earth elements. Since the rare earth elements are rare, and the governments of the countries of the reserve of the rare earth elements have conditionally limited their export. The prices of the rare earth elements grow every year. In additions, the rare earth elements have the issue of the toxicity to the environment according to the assess of the environmental reservation. Besides, the rare earth elements can cause serious damages on the biological bodies if applied thereinto.

SUMMARY OF THE INVENTION

For overcoming the above mentioned problems, the present invention provides the illuminating devices and the method for preparing the inorganic nano-materials therefor. The reagents used in the method for preparing the inorganic nano-materials are scrupulously selected with no harm to the biological body.

In accordance with one aspect of the present invention, a method for preparing an inorganic nano-material is provided. The method includes steps of providing a first solution including plural metal ions; mixing the first solution with a surfactant and adding a reduction agent to generate a second solution, wherein the second solution generates plural metal atoms reduced from the plural metal ions; and adding an oxidation agent into the second solution for oxidizing the plural metal atoms so as to generate plural metal oxides and form the inorganic nano-material.

In accordance with another aspect of the present invention, a method for preparing an inorganic nano-material is provided. The method includes steps of providing a solution including plural metal ions; and mixing the solution with a surfactant and reducing the plural metal ions into plural metal atoms and to generate the inorganic nano-material.

In accordance with a further aspect of the present invention, an illuminating device is provided. The illuminating device includes an organic object having at least one of an outer surface and an internal portion; and an illuminating material emitting a light upon absorbing an energy, and disposed in at least one of the outer surface and the internal portion, wherein the illuminating material includes at least one of an inorganic nano-material and a carbon material having a conjugated carbon double bond.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
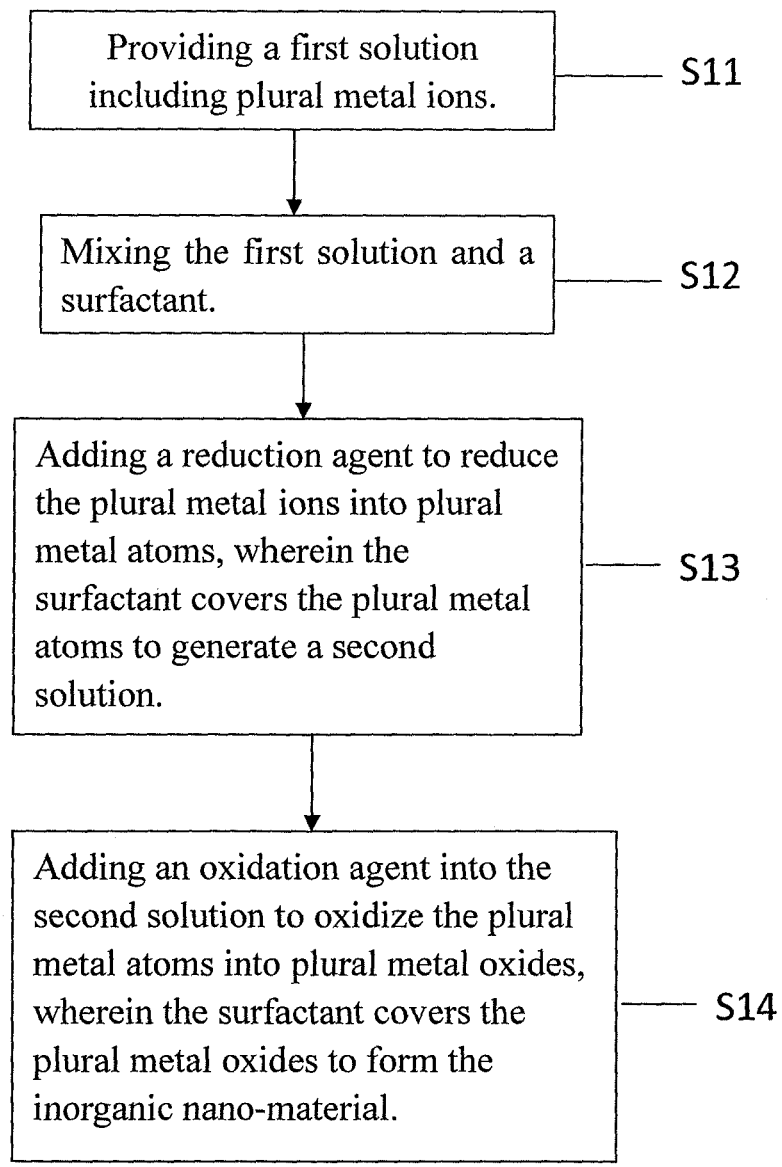
FIG. 1 is the schematic diagram showing a flowchart of the method for preparing the oxide nano-materials in one embodiment of the present invention.

Please refer to FIG. 1, which is the schematic diagram showing a flowchart of the method for preparing the oxide nano-materials in one embodiment of the present invention. In the step S11, the step of providing a first solution including plural metal ions is performed. The plural metal ions, e.g. simple ions or complex ions, can be selected from the ions of zinc, copper, manganese, iron, nickel, ruthenium, osmium, other metals or a combination thereof. In the step S12, the step of mixing the first solution with a surfactant is performed, wherein the surfactant can be selected from, for instance, cetyl trimethyl ammonium bromide, sodium lauryl sulfate, acetic acid or a combination thereof.

In step S13, the step of adding a reduction agent to reduce the plural metal ions into plural metal atoms to generate a second solution is performed. The reduction agent can be selected from, for example, sodium tetrahydroborate, carbon atom or sulfur dioxide. The plural metal atoms can be selected from the atoms of zinc, copper, manganese, iron, nickel, ruthenium, osmium, other metals or a combination thereof.

In the step S14, the step of adding an oxidation agent into the second solution to oxidize the plural metal atoms in the second solution into the plural metal oxides to form the inorganic nano-material is performed. The inorganic nano-material includes the plural metal oxides and the surfactant. The surfactant covers the plural metal oxides. The oxidation agent, for example, can be selected from organic metals.

Figure 2:
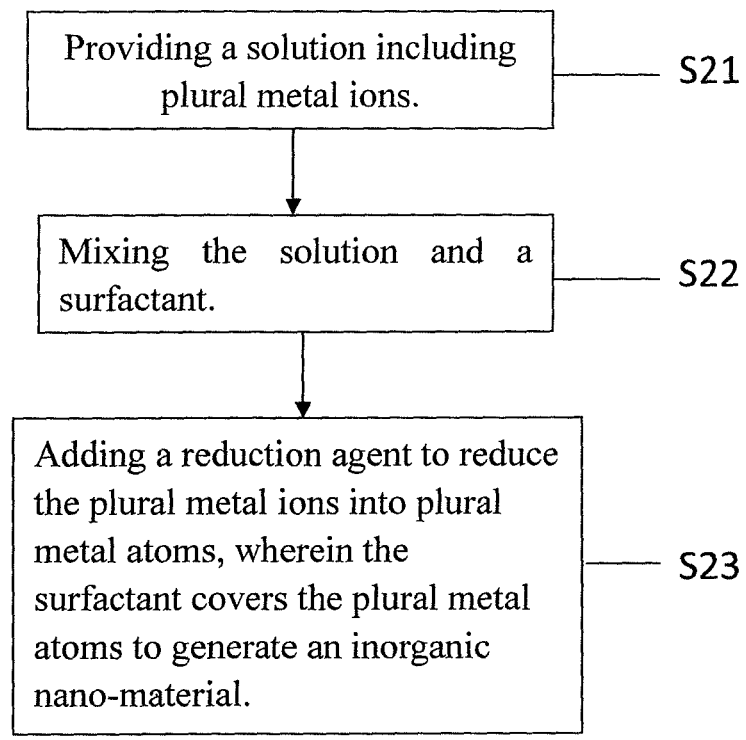
FIG. 2 is the schematic diagram showing a flowchart of the method for preparing the noble metal nano-materials in one embodiment of the present invention.

Please refer to FIG. 2, which is the schematic diagram showing a flowchart of the method for preparing the noble metal nano-materials in one embodiment of the present invention. In the step S21, the step of providing a solution including plural metal ions is performed. The plural metal ions, for instance, can be simple ions or complex ions. The plural metal ions can be noble metal ions selected from the ions of gold, silver, palladium, platinum, other noble metals or a combination thereof.

In the step S22, the step of mixing the solution with a surfactant is performed. The surfactant includes, for instance, sodium citrate. In the step S23, the step of adding a reduction agent into the solution to reduce the plural metal ions into the plural metal atoms to form a first inorganic nano-material. The first inorganic nano-material includes the surfactant and the plural metal atoms. The plural metal atoms form metal clusters, and the surfactant covers the metal clusters. The reduction agent includes, for instance, sodium citrate. The plural metal atoms can be noble metal atoms selected from the atoms of gold, silver, palladium, platinum, other noble metals or a combination thereof.

In one embodiment, an ionic solution is further added into the above mentioned first inorganic nano-material to cause the metal clusters to grow from a spherical shape to a sea-urchin shape or a multiple-pinnacle shape, and to form a second inorganic nano-material having the metal clusters with the sea-urchin shape or multiple-pinnacle shape. The second inorganic nano-material includes the surfactant and the metal clusters with the sea-urchin shape or multiple-pinnacle shape. The surfactant covers the metal clusters with the sea-urchin shape or multiple-pinnacle shape. The ionic solution includes, for instance, sodium chloride.

Figure 3:
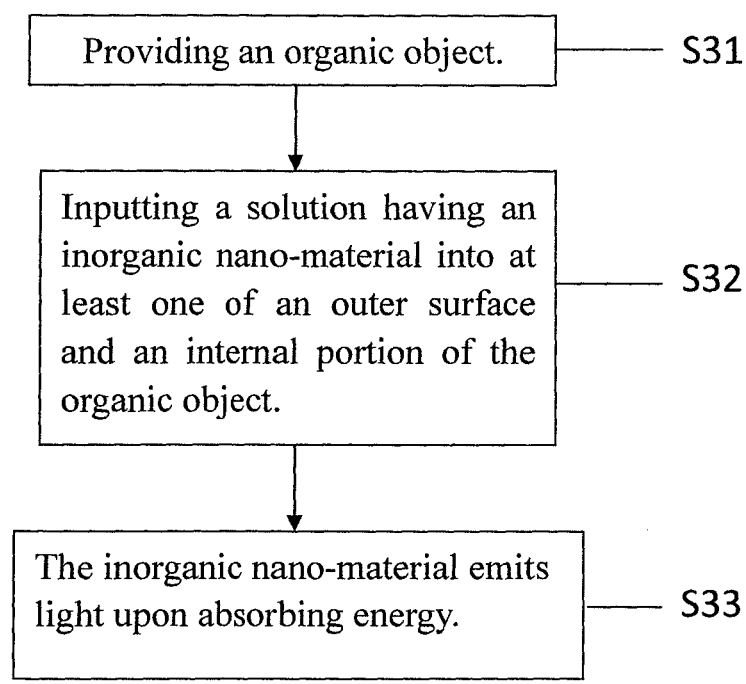
FIG. 3 is the schematic diagram showing a flowchart of the method for preparing the illuminating device in one embodiment of the present invention.

Please refer to FIG. 3, which is the schematic diagram showing a flowchart of the method for preparing the illuminating device in one embodiment of the present invention. In the step S31, the step of providing an organic object is performed. The organic object can be a biological object or a textile, and the biological object can be a plant, an animal or a microorganism.

In the step S32, the step of inputting a solution with the inorganic nano-material into at least one of the outer surface and the internal portion of the organic object by an input method. The organic nano-material can be the noble metal nano-material, oxide nano-material or both. The noble metal nano-material can be selected from the nano-materials of gold, silver, palladium, platinum, other noble metals or a combination thereof. The oxide nano-material can be selected from the nano-materials of zinc oxide, copper oxide, manganese oxide, iron oxide, nickel oxide, ruthenium oxide, osmium oxide, other oxides or a combination thereof. The input method can be a first input method by diffusing or doping the solution into the organic object, e.g. the leaves of a plant, based on the difference in the solution concentrations inside and outside the leaves of the plant. The input method can be a second input method by directly injecting the solution into the organic object, e.g. the leaves of the plant. The input method can be a third input method by directly spraying the solution onto the organic object, e.g. the leaves of the plant. The input method can be a fourth method by actively transporting the inorganic nano-material combined with gene or protein into the organic object, e.g. the body of the plant.

In the step S33, the inorganic nano-material absorbs energy to emit light, where the external energy excites the inorganic nano-material in at least one of the outer surface and the internal portion of the organic object to emit light, and the light includes fluorescent or phosphorescent light. The external energy can include light energy or electrical energy. The inorganic nano-material is excited to a high energy state upon absorbing the external energy, and emits the fluorescent or phosphorescent light within the visible wavelength range during the process of releasing energy to low energy state. For example, the plant with the inorganic nano-material can absorb solar light (violet light) during the day time and then emit fluorescent or phosphorescent light during the night time.

For example, the inorganic nano-material constituted by the gold nano-particles with the sea-urchin shape can work as a stimulating light element, and can emit blue-purple fluorescent light after being radiated with violet light. This fluorescent light stimulates the chlorophylls or other pigments inside the plant twice or more, so the chlorophylls or other pigments can emit fluorescent or phosphorescent light. For instance, the inorganic nano-material constituted by the gold nano-particles with the sea-urchin shape can emit blue-purple fluorescent light, which in turn can stimulate the chlorophylls to emit red light.

For instance, the plant can undergo photosynthesis by the double or multiple stimulations on the chlorophylls, so the carbon fixation effect from the carbon dioxide can proceed during the reaction in the dark. Accordingly, the plant can undergo photosynthesis in the night time to reduce the amount of carbon dioxide in the atmosphere and to reach the efficacy of the environmental conservation.

Figure 4:
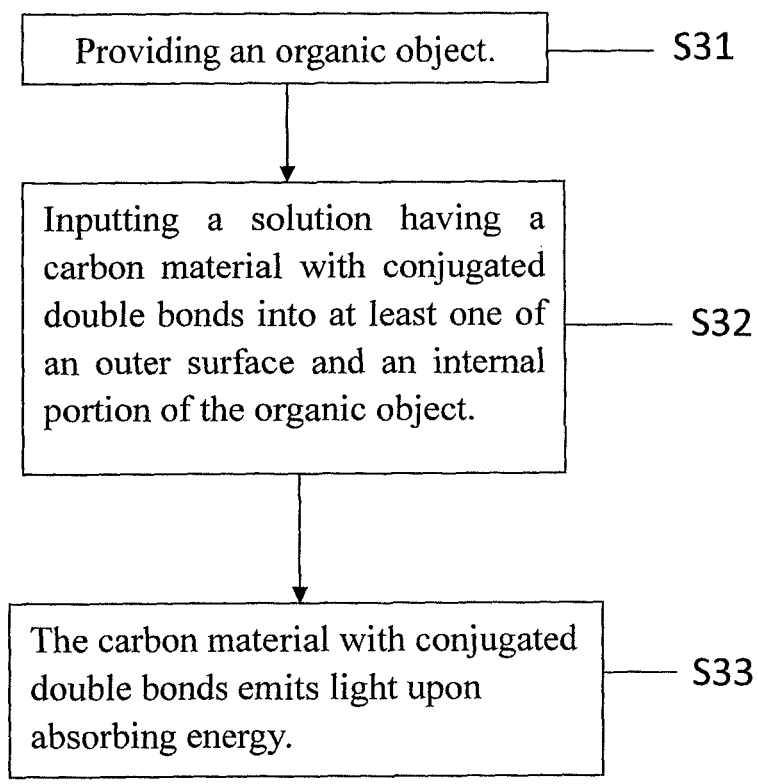
FIG. 4 is the schematic diagram showing a flowchart of the method for preparing the illuminating device in another embodiment of the present invention.

Please refer to FIG. 4, which is the schematic diagram showing a flowchart of the method for preparing the illuminating device in another embodiment of the present invention. In the step S41, the step of providing an organic object is performed. The organic object can be a biological body or a textile. The biological body can be a plant, an animal or a microorganism.

In the step S42, the step of inputting a solution with an illuminating material, e.g. a carbon material with conjugated carbon double bonds in the present embodiment, into at least one of the outer surface and the internal portion of the organic object by an input method. The carbon material with conjugated carbon double bonds can be carbon nano-material or carbon non-nano-material, and can be selected from graphene, graphene oxide, reduced graphene oxide or a combination thereof. For instance, the input method can be a first input method by diffusing or doping the solution into the organic object, e.g. the leaves of a plant, based on the difference in the solution concentrations inside and outside the leaves of the plant. The input method can be a second input method by directly injecting the solution into the organic object, e.g. the leaves of the plant. The input method can be a third input method by directly spraying the solution onto the organic object, e.g. the leaves of the plant. The input method can be a fourth method by actively transporting the carbon material combined with gene or protein into the organic object, e.g. the body of the plant.

In the step S43, the carbon material with conjugated carbon double bonds absorbs energy to emit light, wherein the energy can be external energy including light energy or electrical energy, the emitted light includes fluorescent or phosphorescent light. The carbon material is excited to a high energy state upon absorbing the external energy, and emits the fluorescent or phosphorescent light within the visible wavelength during the process of releasing the energy to a low energy state. For instance, the plant with the carbon material can absorb solar light (violet light) during the day time, and then can emit light during the night time.

For instance, the plant can undergo photosynthesis by the double or multiple stimulations on the chlorophylls, so the carbon fixation effect from the carbon dioxide can proceed during the reaction in the dark. Accordingly, the plant can undergo photosynthesis in the night time to reduce the amount of carbon dioxide in the atmosphere and to reach the efficacy of the environmental conservation.

Figure 5:
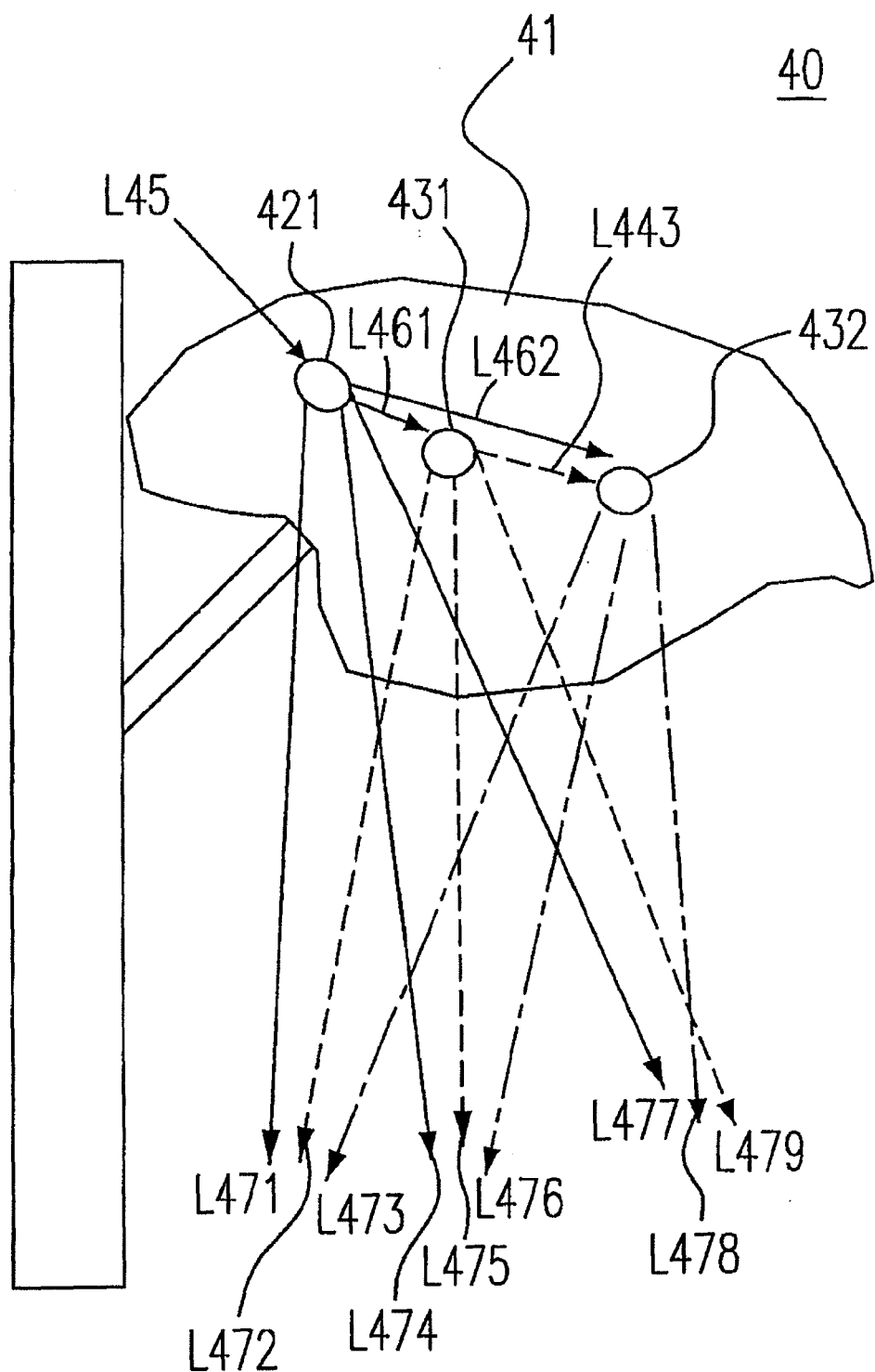
FIG. 5 is the schematic diagram showing an illuminating way of the illuminating device in one embodiment of the present invention.

Please refer to FIG. 5, which is the schematic diagram showing an illuminating way of the illuminating device in one embodiment of the present invention. As shown in FIG. 5, the illuminating device 40 can be an organic object, and can include plural illuminating elements 41. The illuminating elements 41 can include an illuminating material, e.g. inorganic nano-material or carbon material with conjugated carbon double bonds. In this embodiment, the illuminating elements 41 include the inorganic nano-materials 421 and pigments 431 and 432. The inorganic nano-material 421 can be disposed in at least one of the outer surface and the internal portion of the illuminating device 40. Upon absorbing the external energy L45, the inorganic nano-materials 421 emit plural light beams L471, L474 and L477 toward the outside the illuminating element 41, and emit plural light beams L461 and L462 inside the illuminating element 41. The light beams L461 and L462 stimulate the pigments 431 and 432, respectively. The pigment 431 emits plural light beams L472, L475 and L479 toward the outside of the illuminating element 41, and emits the light beam L443 to stimulate the pigment 432, so the pigment 432 emits plural light beams L473, L476 and L478 toward the outside of the illuminating element 41.

For example, the illuminating device 40 is a plant, the plural illuminating elements 41 are the leaves of the plant, and the plural pigments 431 and 432 are chlorophylls or other ancillary pigments. In one embodiment, the inorganic nano-materials 421 constituted by the gold nano-material with sea-urchin shape absorb the external light energy L45, e.g. violet light energy, under the radiation of the external energy L45, and then emit blue-purple light beams L471, L474, L477, L461 and L462, among which the light beams L471, L474 and L477 are emitted toward the outside of the illuminating element 41. For instance, the inorganic nano-materials 421 after absorbing the external energy L45 make the leaves emit light. The light beams L461 and L462 stimulate the pigments 431 and 432 twice or more, and then the pigment 431 emits light beams L472, L475 and L479 toward the outside of the illuminating element 41. The pigment 431 emits the light beam L443 to stimulate the pigment 432, so the pigment 432 emits L473, L476 and L478 toward the outside of the illuminating element 41. For instance, the inorganic nano-materials 421 constituted by the gold nano-material with sea-urchin shape can emit blur-purple fluorescent light, which in turn stimulate neighboring chlorophylls to emit red light.

Some embodiments of the present invention are described in the followings.

1. A method for preparing an inorganic nano-material includes steps of:
providing a first solution including plural metal ions;
mixing the first solution with a surfactant and adding a reduction agent to generate a second solution, wherein the second solution generates plural metal atoms reduced from the plural metal ions; and
adding an oxidation agent into the second solution for oxidizing the plural metal atoms so as to generate plural metal oxides and form the inorganic nano-material.

2. A method of the embodiment 1, wherein the inorganic nano-material comprises the plural metal oxides and the surfactant, and the surfactant covers the plural metal oxides.

3. A method of any one of the above embodiments, wherein the plural metal atoms comprise one selected from a group consisting of zinc, copper, manganese, iron, nickel, ruthenium, osmium and a combination thereof.

4. A method of any one of the above embodiments, wherein the plural metal oxides comprise one selected from a group consisting of zinc oxide, copper oxide, manganese oxide, iron oxide, nickel oxide, ruthenium oxide, osmium oxide and a combination thereof.

5. A method of any one of the above embodiments, wherein the surfactant comprises one selected from a group consisting of a cetyl trimethyl ammonium bromide, a sodium lauryl sulfate and an acetic acid.

6. A method of any one of the above embodiments, wherein:
the reduction agent includes one selected from a group consisting of a sodium tetrahydroborate, a carbon atom and a sulfur dioxide; and
the oxidation agent includes an organic metal.

7. A method for preparing an inorganic nano-material includes steps of:
providing a solution including plural metal ions; and
mixing the solution with a surfactant and reducing the plural metal ions into plural metal atoms and to generate the inorganic nano-material.

8. A method of any one of the above embodiments, wherein the inorganic nano-material comprises the surfactant and the plural metal atoms, the plural metal atoms form a metal cluster, and the surfactant covers the metal cluster.

9. A method of any one of the above embodiments further includes a step of adding an ionic solution including a sodium chloride to cause the metal cluster to grow from a spherical shape to a sea-urchin shape to form the inorganic nano-material.

10. A method of any one of the above embodiments, wherein the inorganic nano-material includes the surfactant and the metal cluster of the sea-urchin shape, and the surfactant covers the metal cluster of the sea-urchin shape.

11. A method of any one of the above embodiments, wherein the plural metal atoms are noble metal atoms including one selected from a group consisting of a gold, a silver, a palladium, a platinum and a combination thereof.

12. A method of any one of the above embodiments, wherein the surfactant includes a sodium citrate.

13. A method of any one of the above embodiments, wherein the step of reducing the plural metal ions into the plural metal atoms is performed by adding a reduction agent to reduce the plural metal ions into the plural metal atoms, and the reduction agent includes a sodium citrate.

14. An illuminating device includes:
an organic object having at least one of an outer surface and an internal portion; and
an illuminating material emitting a light upon absorbing an energy, and disposed in at least one of the outer surface and the internal portion, wherein the illuminating material includes at least one of an inorganic nano-material and a carbon material having a conjugated carbon double bond.

15. An illuminating device of the embodiment 14, wherein the organic object is one of a biological body and a textile.

16. An illuminating device of any one of the above embodiments, wherein the biological body is one of a plant and an animal.

17. An illuminating device of any one of the above embodiments, wherein the biological body is a plant having a leaf and emitting the light through the leaf.

18. An illuminating device of any one of the above embodiments, wherein the inorganic nano-material comprises a noble metal nano-material including one selected from a group consisting of a gold, a silver, a palladium, a platinum and a combination thereof.

19. An illuminating device of any one of the above embodiments, wherein the inorganic nano-material comprises an oxide nano-material including one selected from a group consisting of zinc oxide, copper oxide, manganese oxide, iron oxide, nickel oxide, ruthenium oxide, osmium oxide and a combination thereof.

20. An illuminating device of any one of the above embodiments, wherein the carbon material comprises one selected from a group consisting of a graphene, a graphene oxide, a reduced graphene oxide and a combination thereof.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing an inorganic nano-material, comprising steps of:
providing a first solution including plural metal ions;
mixing the first solution with a surfactant and adding a reduction agent to generate a second solution, wherein the second solution generates plural metal atoms reduced from the plural metal ions; and
adding an oxidation agent into the second solution for oxidizing the plural metal atoms so as to generate plural metal oxides and form the inorganic nano-material, wherein the oxidation agent is an organic metal salt.

2. A method of claim 1, wherein the inorganic nano-material comprises the plural metal oxides and the surfactant, and the surfactant covers the plural metal oxides.

3. A method of claim 1, wherein the plural metal atoms comprise one selected from a group consisting of zinc, copper, manganese, iron, nickel, ruthenium, osmium and a combination thereof.

4. A method of claim 1, wherein the plural metal oxides comprise one selected from a group consisting of zinc oxide, copper oxide, manganese oxide, iron oxide, nickel oxide, ruthenium oxide, osmium oxide and a combination thereof.

5. A method of claim 1, wherein the surfactant comprises one selected from a group consisting of a cetyl trimethyl ammonium bromide, a sodium lauryl sulfate and an acetic acid.

6. A method of claim 1, wherein:
the reduction agent includes one selected from a group consisting of a sodium tetrahydroborate, a carbon atom and a sulfur dioxide.

7. A method for preparing an inorganic nano-material, comprising steps of
providing a solution including plural metal ions;
mixing the solution with a surfactant and reducing the plural metal ions into plural metal atoms; and
adding an ionic solution to cause a metal cluster to grow from a spherical shape to a sea-urchin shape to form the inorganic nano-material.

8. A method of claim 7, wherein the inorganic nano-material comprises the surfactant and the plural metal atoms, the plural metal atoms form the metal cluster, and the surfactant covers the metal cluster.

9. A method of claim 7, wherein the ionic solution includes a sodium chloride.

10. A method of claim 7, wherein the inorganic nano-material includes the surfactant and the metal cluster of the sea-urchin shape, and the surfactant covers the metal cluster of the sea-urchin shape.

11. A method of claim 7, wherein the plural metal atoms are noble metal atoms including one selected from a group consisting of a gold, a silver, a palladium, a platinum and a combination thereof.

12. A method of claim 7, wherein the surfactant includes a sodium citrate.

13. A method of claim 7, wherein the step of reducing the plural metal ions into the plural metal atoms is performed by adding a reduction agent to reduce the plural metal ions into the plural metal atoms, and the reduction agent includes a sodium citrate.

* * * * *